United States Patent

Sermage

[11] Patent Number: 5,949,578
[45] Date of Patent: Sep. 7, 1999

[54] REFLECTIVE GRATING FOR OPTICAL DIFFRACTION, AND MANUFACTURING METHODS

[75] Inventor: Bernard Sermage, Meudon, France

[73] Assignee: France Telecom, Paris, France

[21] Appl. No.: 09/026,071

[22] Filed: Feb. 19, 1998

Related U.S. Application Data

[63] Continuation of application No. 08/550,606, Oct. 31, 1995, abandoned.

[30] Foreign Application Priority Data

Nov. 3, 1994 [FR] France .................................. 94 13134

[51] Int. Cl.⁶ .............................. G02B 5/18; G02B 27/42; G01J 3/24
[52] U.S. Cl. ......................... 359/571; 359/572; 356/305; 356/308; 356/328; 356/334
[58] Field of Search .................................... 359/569–572; 356/305, 308, 328, 334

[56] References Cited

U.S. PATENT DOCUMENTS

| 4,748,614 | 5/1988 | Dammann et al. | 370/3 |
| 5,221,835 | 6/1993 | Setani | 359/571 |
| 5,223,703 | 6/1993 | Setani | 359/571 |
| 5,285,254 | 2/1994 | De Sa | 356/308 |
| 5,502,707 | 3/1996 | Komma et al. | 359/572 |
| 5,528,364 | 6/1996 | Koike | 356/334 |

*Primary Examiner*—Jon Henry
*Attorney, Agent, or Firm*—Nilles & Nilles SC

[57] ABSTRACT

A reflective grating for the optical diffraction of light rays comprises k juxtaposed, grooved, plane sub-gratings, the planes of the sub-gratings being offset in terms of height with respect to one another along the normal to the plane of the reflective surface of the grooves, enabling the difference in optical path of the grating to be reduced to the difference in optical path between the two ends of a sub-grating.

5 Claims, 3 Drawing Sheets

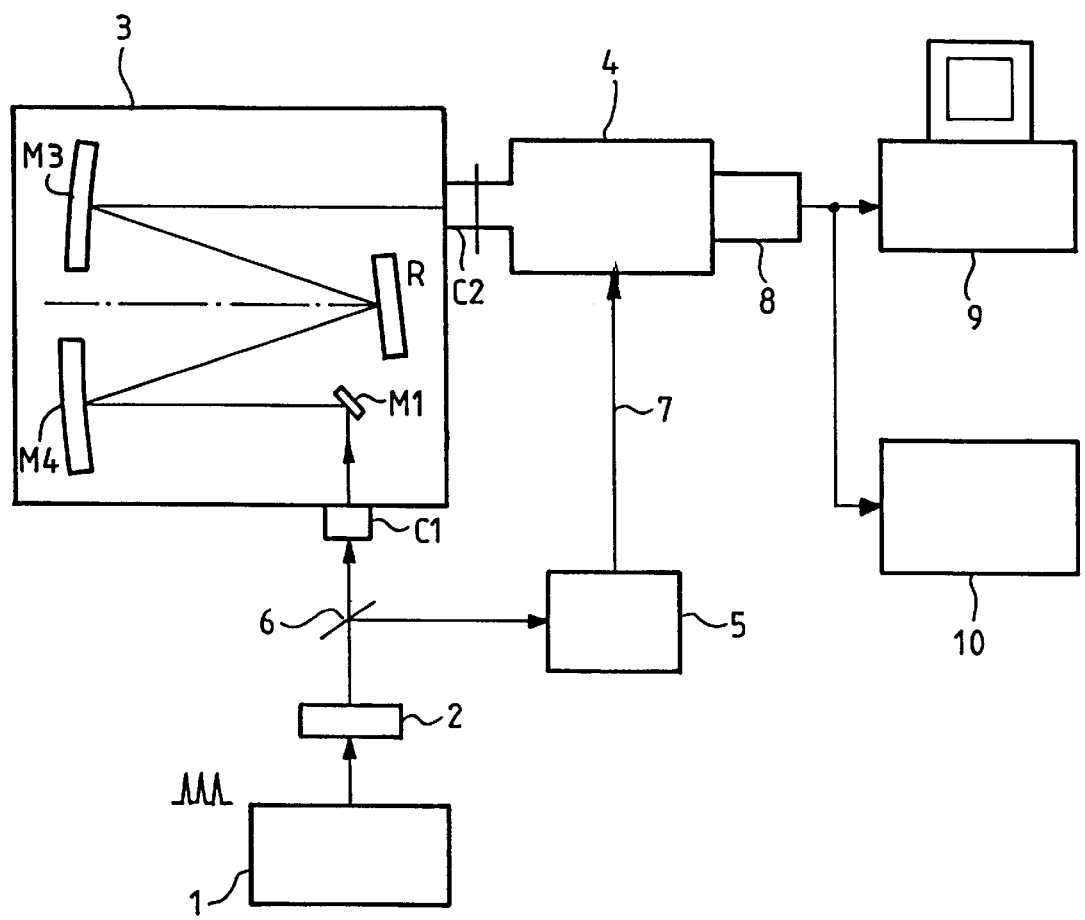
FIG_1

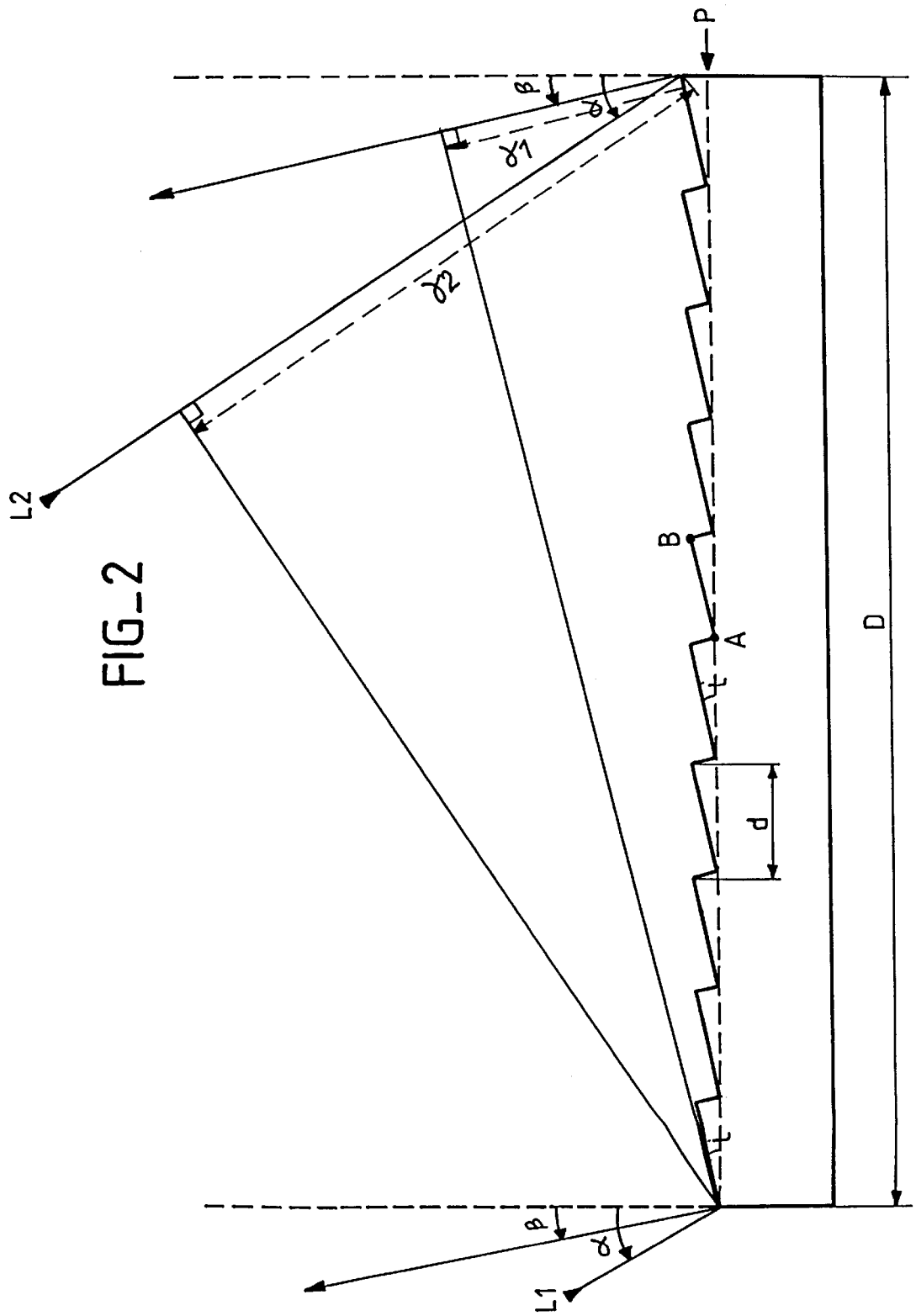
FIG_2

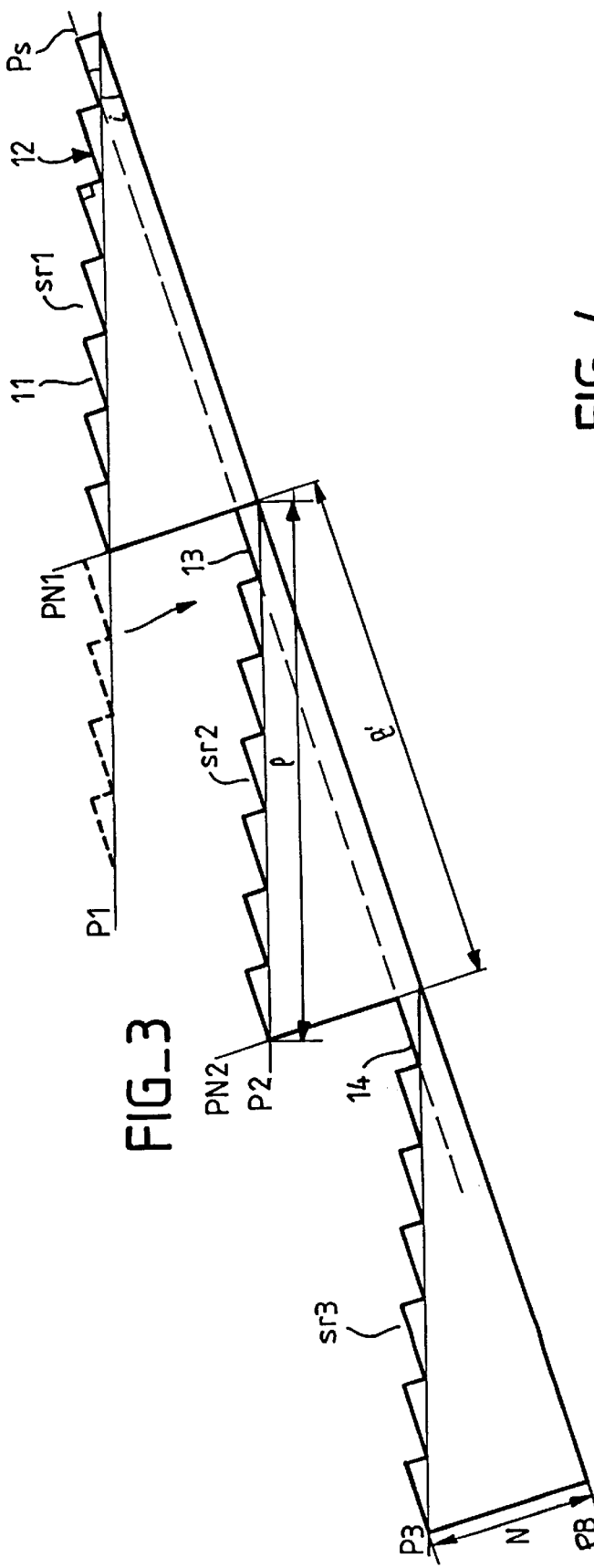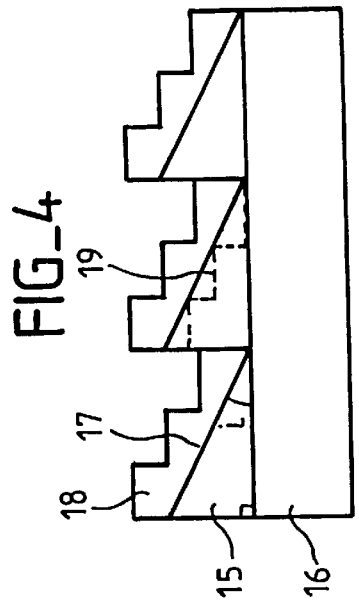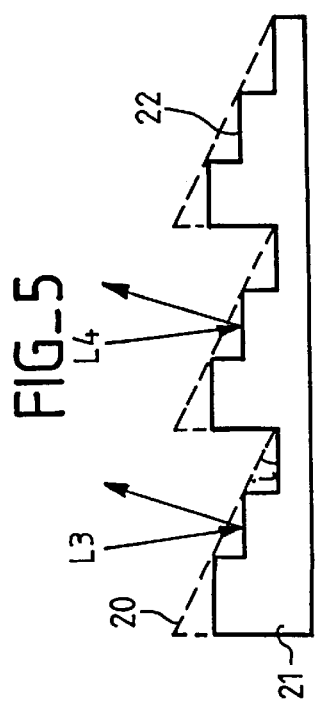

//\# REFLECTIVE GRATING FOR OPTICAL DIFFRACTION, AND MANUFACTURING METHODS

CROSS REFERENCE TO A RELATED APPLICATION

This is a continuation of commonly assigned application Ser. No. 08/550,606, filed Oct. 31, 1995 and entitled REFLECTIVE GRATING FOR OPTICAL DIFFRACTIVE, AND MANUFACTURING METHODS now abandoned.

BACKGROUND OF THE INVENTION

1. Field of the Invention

The invention relates to a reflective grating for the optical diffraction of light rays and to methods for the manufacture of such a grating.

A grating is an optical surface with a periodic disturbance that disperses light by transmission or by reflection. The disturbance may be a slit (in the case of transmission), a line or a groove (in the case of reflection), or again it may be obtained by the printing of a sinusoidal fringe on a photographic plate (this is a sinusoidal grating).

If we consider a plane grating with grooves that are rectilinear parallel and equidistant along the width of the grating, by placing a pin-point source at the focal point of a collimator lens, the light is reflected in the regular direction of reflection (maxima value of central interference containing all the radiation from the source) and also in determined directions of maximum values of interference. The positions of the maximum interference depend on the wavelength.

This dispersive phenomenon is especially used in spectroscopy to obtain knowledge about the electronic structure of atoms and molecules on the basis of the optical spectral obtained: spectrographs, spectrometers and other instruments indeed use a monochromator with prism or grating associated with a receiver. The receiver may be a device for recording on a photographic plate (in the case of a spectrograph) or a photoelectrical detector, for example a photomultiplier (in the case of a spectrometer).

2. Description of the Prior Art

In recent applications, the monochromator has been used to study ultra-short optical pulses in the range of one picosecond. The object of these studies notably is to analyze the luminescence of semiconductor materials on the basis of the changes undergone in time by the spectrum at output of the monochromator.

For this purpose a laser 1 (FIG. 1) is used, producing ultra-short pulses in the range of one picosecond at a frequency of about 100 MHz, sent towards a semiconductor sample 2 for which it is sought to study the luminescence.

The incident light reaches the input collimator C1 of the monochromator 3 (vertical input slit, lens) and is then reflected and dispersed (mirrors M1, M4, M3, grating R) to give the output spectrum at the output collimator C2 (horizontal output slit, lens).

At output of the monochromator a streak camera is placed. The high temporal resolution of this streak camera enables analysis of the phenomena in the one-picosecond range. To put it in a simplified way, the camera (not shown) has a scanning tube with a photocathode and a grid electrode between which there prevails an intense electrical field. The camera also has a deflection circuit, a photomultiplier and a phosphorescent screen.

The general principle of the functioning of the camera is as follows: an input slit and a lens focus the incident light on the photocathode of the tube. The photons converted into electrons are accelerated and led towards the deflection field where they are scanned at high speed in the direction perpendicular to the input slit (the vertical direction in this example since the input slit is horizontal). They then go into the photomultiplier and form the optical image by bombarding the phosphorescent screen.

The time at which the electrons are liberated from the photocathode may be determined by their angle of deflection given, in the example, by their vertical position on the phosphorescent screen. Thus, the temporal axis corresponds to the axis perpendicular to the input slit on the phosphorescent screen of the camera.

By using, as incident light, the output spectrum of the monochromator on the vertical output slit of this monochromator, the axis of wavelengths is obtained, constituting a second dimension on the phosphorescent screen along the axis perpendicular to the temporal axis.

Thus, in the example, there is the temporal axis, which is the horizontal axis on the phosphorescent screen, and the axis of wavelengths, which is the vertical axis on the phosphorescent screen.

In order that the device may work, it is again necessary to synchronize the scanning (or deflection) voltage of the streak camera with the arrival of the electronics in the deflection field. For example, a photodiode-based detector 5 is used. A part of the incident light (plate 6) is deflected towards this detector which gives the camera 4 an activation signal (7) to synchronize the scanning voltage of the deflection circuit of the camera.

Streaks can then be observed on the output screen of the streak camera 4. These streaks show the changes undergone by the luminescence emitted by the sample excited by the laser 1, as a function of the wavelength (horizontal axis) and of time (vertical axis). The luminescence may thus be analyzed by an output read circuit comprising, for example, a vidicon camera 8 placed at output of the streak camera 4 that delivers a video signal to peripheral circuits such as a video monitor 9, a temporal analyzer 10, etc.

The device described enables the carrying out of time-resolved spectroscopy.

One problem encountered in the analysis of the image obtained is related to the grating of the monochromator 3.

Indeed, the grating which spectrally disperses a light pulse also temporally widens the pulse because of the difference in optical path. The phenomenon is shown in FIG. 2 for two rays each arriving at one of the two ends of the grating.

In the example, the grating is one with grooves spaced out at a pitch d. It has a width D on which there are made grooves that are parallel and equidistant (with the pitch d). The density of grooves per millimeter is referenced N=1/d.

The groove could be a simple etched line. In the example, it has a triangular cross-section. The rays reach the surface, for example AB, inclined by an angle i with reference to the plane P of the grating.

The profile of the groove affects the distribution of the light energy in the different orders of interference. The triangular cross-sectioned profile is particularly used in monochromators for its ability to concentrate the light energy in a single order of interferences.

Let us now take two light rays L1 and L2 with a wavelength $\lambda$ reaching the grating at one and the same incidence $\alpha$ with respect to the normal to the plane P of the grating. The ray L1 reaches the end A, the ray L2 reaches the other end B. They are diffracted at the angle of diffraction β (with respect to the normal to the plane P of the grating).

The equation of the gratings can then be written as follows:

$$m\lambda = d(\sin\alpha + \sin\beta) = 1/N(\sin\alpha + \sin\beta) \quad (1)$$

where m is the order of interferences considered (with m as a positive or negative integer).

The optical path travelled by L1 will be longer in the example than that travelled by L2. The difference $\Delta\gamma$ is written in the case of FIG. 2 as follows:

$$\Delta\gamma = \gamma 2 + \gamma 1 = D(\sin\alpha + \sin\beta) \quad (2)$$

namely, in using the equation (1):

$$\Delta\gamma = DmN\lambda$$

The time difference for the first order of interference (m=1) is then written as follows:

$$\Delta t = \Delta\gamma/C = DN\lambda/C \quad (3)$$

The temporal dispersion $\Delta t$ for a given wavelength $\lambda$ and a determined order of interference m depends only on the width D and on the density N of lines (grooves) of the grating. In one digital example related to the study of ultra-short pulses (picoseconds), we have:

D=60 mm (millimeters)
N=1200 lines/mm
d=1/N=0.83 μm (micrometers).

giving

For a monochromatic source with a wavelength $\lambda=0.76$ μm, we then have for m=1:

$\Delta t = DN\lambda/C = 60.1200.0,76.10^{-6}/3.10^8$ $\Delta t = 182$ picoseconds.

Given the order of magnitude of the phenomena to be observed (pulses of the order of one picosecond), this temporal dispersion is highly inconvenient.

We might then be tempted to reduce the characteristic magnitudes N and D of the grating.

For example, by reducing the width D of the grating to 4 millimeters, a temporal dispersion $\Delta t$ of 12 picoseconds is obtained.

If the density of lines is reduced by half (N=600 lines/mm), we obtain $\Delta t=6$ picoseconds.

It is however necessary to obtain the greatest possible luminosity in the output image. This is already what has led to prefer a particular profile for the grooves of the grating (the triangular cross-section) as explained here above.

Now, reducing the width of the grating means also reduces the output luminosity. This is unacceptable.

It is also necessary to obtain the greatest spectral resolution. The spectral resolution R of a grating gives a numerical value of its ability to enable a distinction to be made between two wavelengths that are very close to each other with a difference between them of $\Delta\lambda$:

$$R = \lambda/\Delta\lambda = m.D.N \quad (4)$$

For the first order of interference (m=1), we therefore have:

$$R = \lambda/\Delta\lambda = D.N \quad (5)$$

Furthermore, the following relationship:

$$\Delta t.\Delta\lambda = \lambda^2/C \quad (6)$$

limits the spectral resolution for a given temporal dispersion $\Delta t$.

Thus, therefore, if N and L are chosen so as to obtain a minimum temporal dispersion, the spectral resolution of the grating is then reduced.

In the digital example given here above, for $\lambda=0.76$ μm, with N=1200 lines/mm and D=60 mm, it has been seen that we then have $\lambda t=182$ picoseconds. We then have $\Delta\lambda=\lambda^2/\Delta t.c=0.01$ nanometers.

However, if N=600 lines/mm and D=4 mm, it has been seen that we then have $\Delta t=6$ picoseconds but then $\Delta^2/\Delta t.C=0,32$ nanometers: the spectral resolution $R=\Delta\lambda/\lambda$ is then considerably reduced. There is therefore always an inevitable compromise between the spectral resolution and the temporal dispersion. However, the monochromator itself limits the spectral resolution because of the width of the input slit and the spectral resolution of the detection system formed by the streak camera 4 and the vidicon tube 8 (FIG. 1). It is therefore necessary to reduce the spectral resolution of the grating so as to adapt it to the spectral resolution of the monochromator or more generally to the desired spectral resolution. The temporal dispersion is thus diminished at the same time.

SUMMARY OF THE INVENTION

An object of the invention is a grating that provides for a minimum temporal dispersion while at the same time retaining high luminosity and appropriate spectral resolution.

As claimed, the invention relates to a reflective grating for the optical diffraction of light rays.

According to the invention, the grating comprises k juxtaposed, grooved, plane sub-gratings, the planes of the sub-gratings being offset in terms of height with respect to one another along the normal to the plane of the reflective surface of the grooves, enabling the difference in optical path of the grating to be reduced to the difference in optical path between the two ends of a sub-grating.

Preferably, the sub-gratings have the same width and the same density of grooves, and grooves of the same rank are on one and the same plane parallel to the plane of the grating.

More particularly, with the reflective surface of the grooves forming an angle of inclination i with the plane of the corresponding sub-grating, the plane of each sub-grating forms an angle of inclination i with the plane of the grating.

The invention also relates to a method for the manufacture of a reflective grating for the optical diffraction of light rays. According to a first variant, it comprises the following steps:

the preparation of k identical rectangular triangle shims made of glass or silica;

the assembling of k shims on a glass or silica plate so that the hypotenuses of said shims form k juxtaposed planes having the same inclination i with respect to the plane of the plate;

a sub-grating being placed on the hypotenuse of each of the shims.

According to another variant, the method comprises the making, by abrasion, of k juxtaposed planes with an inclination i in a parallelepiped block of glass or silica and the etching of these planes to form k grooved sub-gratings.

BRIEF DESCRIPTION OF THE DRAWINGS

Other features and advantages of the invention are provided in the following description, given by way of a non-restrictive indication of the invention and made with reference to the appended drawings, in which:

FIG. 1 already described shows a device for the study of ultra-short light pulses;

FIG. 2 already described gives a schematic view of the phenomenon of difference in optical path applied to a reflective grooved plane grating;

FIG. 3 gives a schematic view of the cross-section of a reflective grating according to the invention;

FIG. 4 shows the cross-section of a grating obtained by a method of manufacture according to the invention; and FIG. 5 shows the cross-section of a grating obtained by another method of manufacture according to the invention.

MORE DETAILED DESCRIPTION

FIG. 3 gives a schematic view of a cross-section of a grating according to the invention.

The grating has three plane sub-gratings sr1, sr2 and sr3. Their respective planes P1, P2 and P3 are parallel and preferably equidistant.

The grooves 11 have a triangular cross-section (rectangular triangle in the example shown). The reflective surface 12 of a groove is oriented along a plane Ps having an inclination i with respect to the planes P1, P2, P3 of the sub-gratings.

According to the invention, the sub-gratings are juxtaposed and offset in height with respect to one another along the normal to the reflective surface of the grooves, namely along the normal to the plane Ps having an inclination i.

To put it in terms of analogy, as compared with a grooved plane grating placed in the plane P1, this grating is divided into k parts (here k=3), and each part is made to slide along the normal to the plane Ps going through the line of separation between this part and the preceding part.

Ultimately, the grating obtained has a base PB oriented in a plane parallel to the reflective surfaces of the groove and comprises k successive, juxtaposed planes P1, P2, P3 having an inclination i with respect to the base PB of the grating. On each of these planes, there is a respective sub-grating sri, sr2, sr3.

In addition to the periodic disturbance provided by the grooves, there is the disturbance due to the offset of the planes of sub-gratings.

It is therefore advantageous to use k identical sub-gratings, namely identical in terms of width 1, profile of the grooves, density of lines (grooves) N.

To put it in a simplified way, if the initial grating has a width D, it is divided into k parts having a width 1 (k sub-gratings). We then have D=k1. Stated another way, 1=D/k.

The smallest difference in wavelength $\Delta\lambda$ that can be discerned through the grating according to the invention is a function of the number of lines (grooves) of a sub-grating. It is therefore changed with respect to a plane grating having a width D=k1 and the same characteristics (density N, profile). We therefore have $\Delta\lambda=\lambda/1N=\lambda k/DN$.

The maximum optical path difference of the grating according to the invention becomes the optical path difference of a sub-grating. In the example of FIG. 3, the three sub-gratings are identical with a width 1, a density N and the same profile of grooves. They also have been advantageously offset by the height z of a grating. The grooves of the same rank, for example the grooves 12, 13 and 14, are thus on the same plane Ps: the offsetting of the sub-gratings thus makes it possible to compensate for the difference in optical paths of the previous sub-grating.

This phenomenon is shown in FIG. 5: the rays L3 and L4 that reach grooves of the same rank travel along the same optical path. In this case shown, the maximum optical path difference is given by:

$$\Delta\gamma = 1N\lambda = DN\lambda/k \quad (7)$$

and the temporal dispersion by:

$$\Delta t = DN\lambda/kC. \quad (8)$$

As compared with a plane grating having a width D, the grating according to the invention thus enables a reduction in the temporal dispersion by a ratio k.

As discussed above, it is desirable to maintain a low temporal dispersion $\Delta t$ in the single picosecond range (a $\Delta t$ of 6 picoseconds being sought in the abovedescribed example). Maintaining low temporal dispersions can be problematic for wide gratings, i.e., gratings having a width D more than 10 mm and typically a width of some tens of millimeters. However, as should be apparent from Equations (7) and (8), $\Delta t$ can be retained in the preferred single-picosecond range, even for wide gratings, by selecting k to set the equation 1=D/k to be equal to about 1 mm. Hence, if, pursuant to the above example, D is 60 mm, selecting a k of 60 will set D/k to be equal to the desired value of about 1 mm. $\Delta t$, which would be 182 picoseconds at a source wavelength of 0.76 μm in the illustrative example but for incorporating k in accordance with the present invention, thereby is reduced by a factor of k so that $\Delta t'=\Delta t/k=182/60=$approximately 3 picoseconds.

If the pitch values of the sub-gratings are identical but the offset is not exactly equal to the height of a sub-grating (being smaller or greater than this height), then the maximum temporal dispersion of the sub-grating is equal to the maximum of the values of temporal dispersion of the sub-gratings. However, the grating continues to work accurately and the spectral resolution in practice is always that of a sub-grating. Furthermore, the grating according to the invention keeps the same luminosity as a plane grating with a width D.

A method for the manufacture of a grating according to the invention is shown in FIG. 4. It has k identical sub-gratings.

It comprises the making of k identical rectangular triangle shims (15) made of glass or silica and the assembling of these k shims on a glass or silica plate 16 so that the hypotenuse 17 of these shims forms k planes juxtaposed having the same inclination i with respect to the plane of the plate 16. The assembling can be done by example by bonding.

A respective sub-grating 18 is placed on the hypotenuse of each of these shims.

In a first variant, the sub-gratings are obtained by cutting out a grooved plane grating etched on a glass or silica plate. They are then assembled on the hypotenuse of the shims. Preferably, the glass plate is thin, with a thickness of about one millimeter. The assembling is done for example by bonding.

In a second variant, the sub-gratings are directly etched on the hypotenuse of the shims. The sub-grating 19 obtained according to this variant is shown in dashes in FIG. 4.

Another method for the manufacture of a grating according to the invention, shown in FIG. 5, comprises the marking of k successive planes 20 with an inclination i, by abrasion, in a parallelepiped-shaped block of glass or silica and the etching of these planes to make the k grooved sub-gratings 22.

The etching is done in every case by well-known mechanical methods, using a diamond, or by holographic methods, on optically polished surfaces on which there is deposited a thin metal layer (an aluminum layer with a thickness of some micrometers) or a photosensitive resin.

I claim:

1. A reflective grating for the optical diffraction of light rays, said reflective grating having a width (D) of more than 10 mm and comprising k juxtaposed, grooved, plane sub-gratings, the planes of the sub-gratings being offset in terms of height with respect to one another along the normal to the plane of the reflective surface of the grooves, enabling the difference in optical path of the grating to be reduced to the difference in optical path between two ends of a sub-grating, wherein k is selected to cause the grating to have a temporal dispersion in the single picosecond range when subjected to ultra-short pulses of light of a designated wavelength, wherein the number k of sub-gratings and the width D of the reflective grating are correlated by the equation:

$$D/k = \text{about } 1 \text{ mm.}$$

2. A reflective grating according to claim 1, wherein the sub-gratings have the same width and the same density of the grooves, the grooves having the same rank in each sub-array being located on one and the same plane parallel to the plane of the grating.

3. A reflective grating according to claim 1, wherein the reflective surface of the grooves forms an angle of inclination i with respect to the plane of the corresponding sub-grating, and wherein the plane of each sub-grating forms an angle of inclination i with respect to the plane of the grating.

4. A reflective grating for the optical diffraction of light rays, said reflective grating having a width (D) of more than 10 mm and comprising k juxtaposed, grooved, plane sub-gratings, the planes of the sub-gratings being offset in terms of height with respect to one another along the normal to the plane of the reflective surface of the grooves, enabling the difference in optical path of the grating to be reduced to the difference in optical path between two ends of a sub-grating, wherein k is selected to cause the grating to have a temporal dispersion in the single picosecond range when subjected to ultra-short pulses of light of a designated wavelength, wherein, for a light source having a wavelength ($\lambda$), the temporal dispersion ($\Delta t$) of the grating at and the number k of sub-gratings are correlated by the equation:

$$\Delta t = DN\lambda/kC$$

where

N = a density of grooves of the reflective grating, and
C = the speed of light.

5. A reflective grating for the optical diffraction of light rays, said reflective grating having a width D of more than 10 mm and comprising k juxtaposed, grooved, plane sub-gratings, the planes of the sub-gratings being offset in terms of height with respect to one another along the normal to the plane of the reflective surface of the grooves, enabling the difference in optical path of the grating to be reduced to the difference in optical path between two ends of a sub-grating, wherein k is selected to cause the grating to have a temporal dispersion in the single picosecond range when subjected to ultra-short pulses of light of a designated wavelength ($\lambda$), and wherein, for a light source having the wavelength ($\lambda$), the temporal dispersion ($\Delta t$) and the number k of sub-gratings are correlated by the equation:

$$\Delta t = DN\lambda/kC$$

where:

N = a density of grooves of the reflective grating, and
C = the speed of light; and
where: D/k = about 1 mm.

* * * * *